United States Patent
Hilber

[11] Patent Number: 6,161,452
[45] Date of Patent: Dec. 19, 2000

[54] PEDAL CRANK DRIVE FOR A BICYCLE

[76] Inventor: Gerhard Hilber, Taxaweg 5, A-6380 St. Johann i. T., Austria

[21] Appl. No.: 09/230,143

[22] PCT Filed: Jul. 22, 1997

[86] PCT No.: PCT/AT97/00169

§ 371 Date: Jan. 19, 1999

§ 102(e) Date: Jan. 19, 1999

[87] PCT Pub. No.: WO98/03391

PCT Pub. Date: Jan. 29, 1998

[30] Foreign Application Priority Data

Jul. 23, 1996 [AT] Austria ..................................... 1321/96

[51] Int. Cl.[7] ....................................................... G05G 1/14
[52] U.S. Cl. ........................... 74/594.1; 474/69; 74/594.2
[58] Field of Search ................................ 74/594.1–594.3; D12/124; 384/458, 515, 545, 431, 512; 188/24.12, 24.17; 474/69

[56] References Cited

U.S. PATENT DOCUMENTS

| | | | |
|---|---|---|---|
| D. 397,967 | 9/1998 | Nakayama | D12/124 |
| 628,791 | 7/1899 | Germaine | 74/594.1 X |
| 3,578,829 | 5/1971 | Hata | 74/594.1 X |
| 4,263,820 | 4/1981 | Wetherald | |
| 4,393,954 | 7/1983 | Soucy et al. | 180/205 |
| 4,574,649 | 3/1986 | Seol | 74/138 |
| 5,024,286 | 6/1991 | Lean et al. | |
| 5,279,524 | 1/1994 | Hilber | 474/69 |
| 5,971,877 | 10/1999 | Hunter et al. | 474/69 |

FOREIGN PATENT DOCUMENTS

| | | |
|---|---|---|
| 0 393 063 | 10/1990 | European Pat. Off. |
| 0 546 004 | 6/1993 | European Pat. Off. |
| 2 024 264 | 8/1970 | France |
| WO92/04230 | 3/1992 | WIPO |
| WO93/08071 | 4/1993 | WIPO |

*Primary Examiner*—Vinh T. Luong
*Attorney, Agent, or Firm*—Collard & Roe, PC

[57] ABSTRACT

A pedal crank drive for a bicycle, comprises a shaft (3) extending through a bearing housing (4), a chain wheel (8) having at least one gear rim (9), where the hub (7) of the chain wheel is rotatably mounted with respect to the shaft (3), and a power transmission spring (10) supported on the one hand on the shaft (3) and on the other hand on the hub (7) of the chain wheel (8) and disposed inside the bearing housing (4). The power transmission spring (10) consist of separate, individual spring elements (11) distributed around the periphery of the shaft (3) and each spring element is supported on the hub (7) of the chain wheel (8) and on the shaft (3).

9 Claims, 4 Drawing Sheets

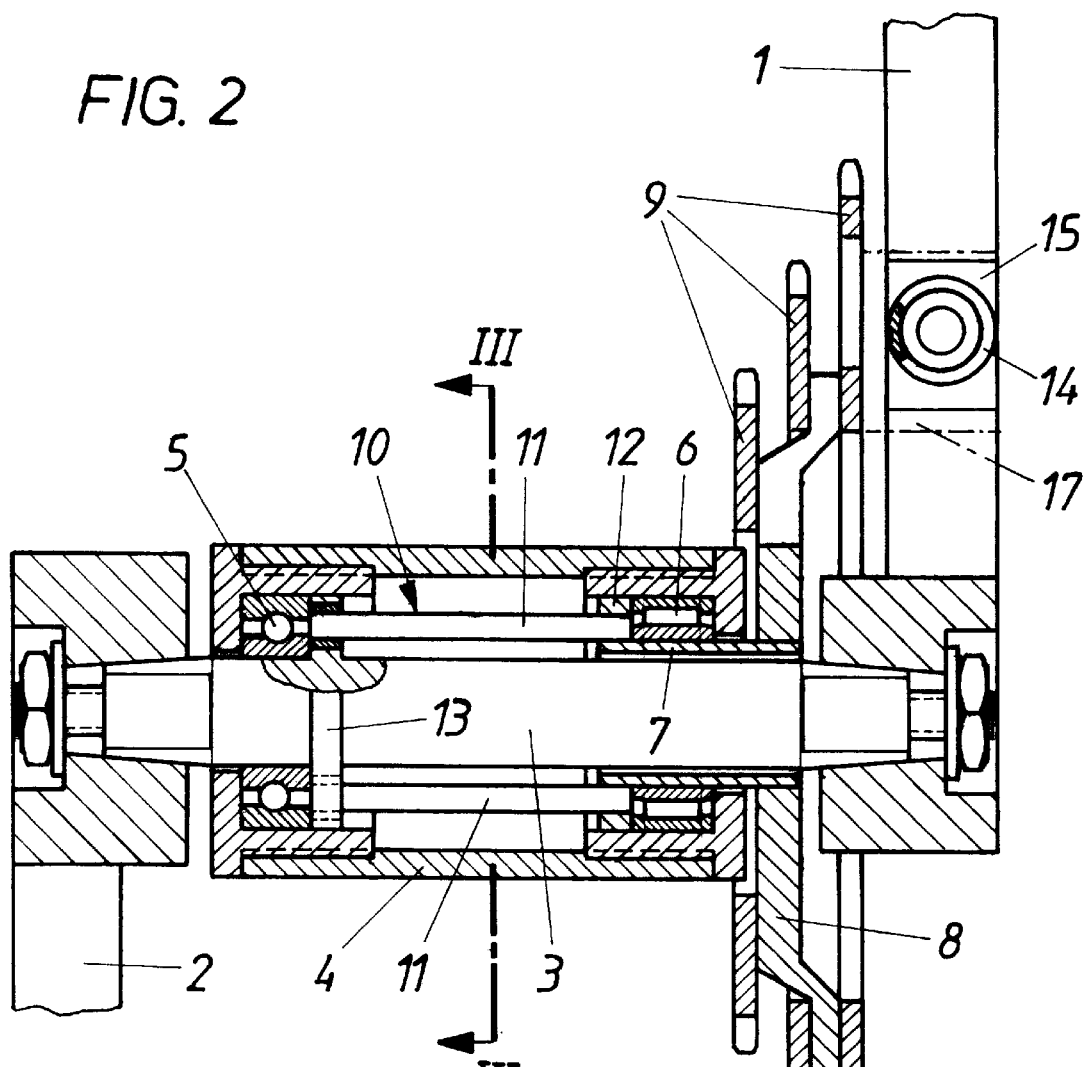
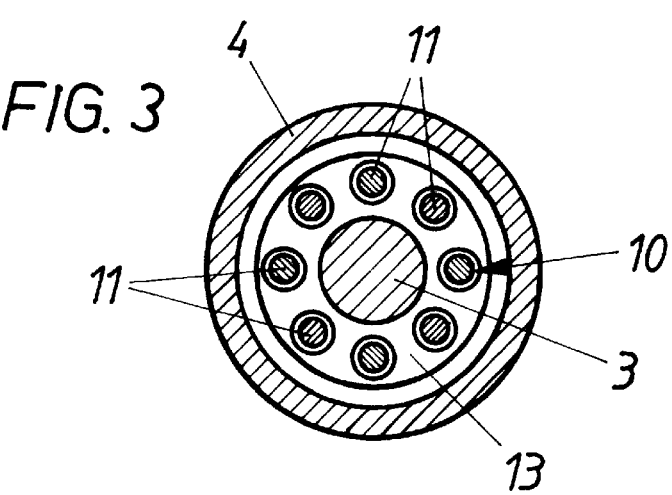

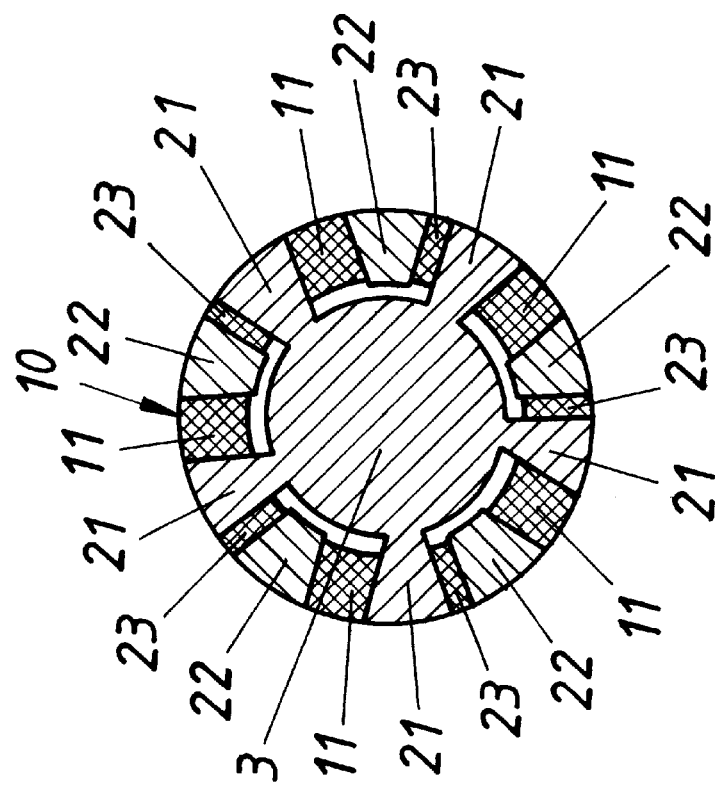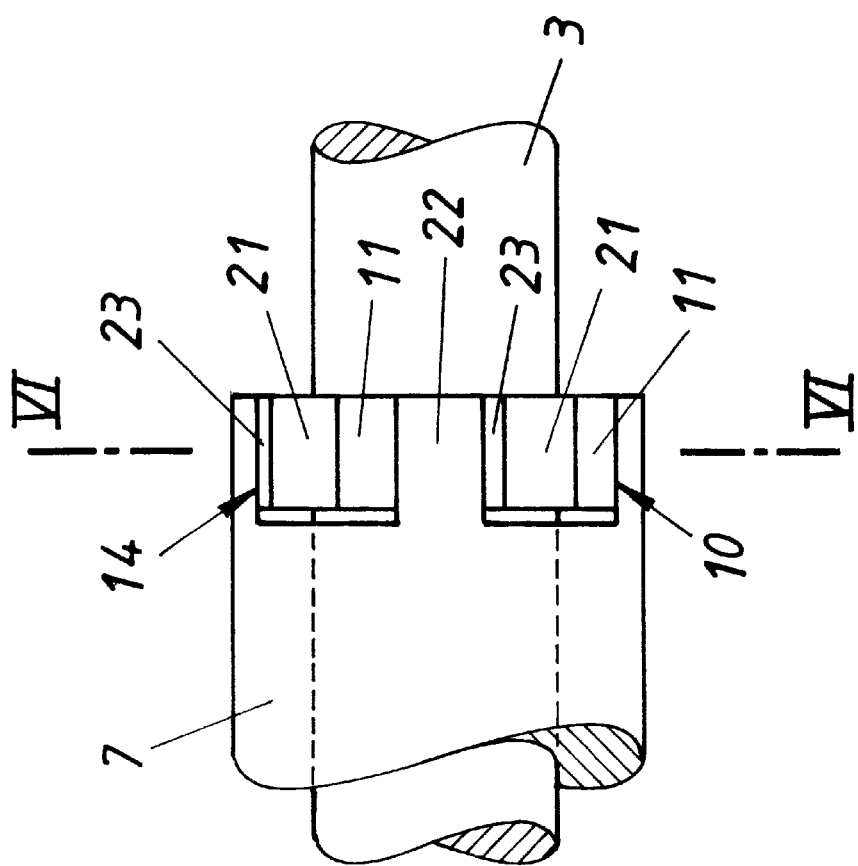

PEDAL CRANK DRIVE FOR A BICYCLE

BACKGROUND OF THE INVENTION

1. Field of the Invention

This invention relates to a pedal crank drive for a bicycle, comprising a shaft extending through a bearing housing, a chain wheel having at least one gear rim, where the hub of the chain wheel is rotatably mounted with respect to the shaft, and comprising a power transmission spring supported on the one hand on the shaft and on the other hand on the hub of the chain wheel and disposed inside the bearing housing.

2. Description of the Prior Art

To obtain an advantageous torque distribution via a chain wheel rotation it is known (EP 0 546 004 B1) to provide between the chain wheel rotatably mounted with respect to the pedal crank shaft and the pedal crank adjacent the chain wheel a power transmission spring on which a load can be applied during a forward rotation of the pedal cranks, where part of the forces applied when treading down the pedal cranks can be stored in said power transmission spring. These stored forces can advantageously be delivered to the chain wheel in the vicinity of the dead center of the pedal crank drive, which involves a better torque distribution via a crank rotation. When the power transmission spring designed as helical spring is dimensioned sufficiently, so as to be able to absorb even major force components within the available, limited range of spring, there is the risk that via the power transmission spring the pedal cranks are rotated back in the dead center regions of the pedal crank drive against the supporting moment to be applied by the cyclist, when the power transmission spring, which is stretched by means of the pedal cranks leading when treading them down, is released again in the vicinity of the dead center. For this reason, there is used a damping spring prestressed in the loading sense of the power transmission spring, so that the power transmission spring can only be released against the force of this damping spring. Since the damping force of such a damping spring increases with increasing relief of the power transmission spring, there is obtained a more uniform torque distribution via a pedal crank rotation. However, the arrangement of the power transmission spring between the pedal crank adjacent the chain wheel and the chain wheel rotatably mounted with respect to the pedal cranks requires special constructive measures with regard to the large forces to be transmitted, which excludes a simple conversion of usual pedal crank drives without power transmission spring. In addition, the constructive modifications of a pedal crank drive, which are necessary when using a power transmission spring, involve a corresponding added weight.

To ensure that in the case of a bicycle with an auxiliary motor the auxiliary motor can automatically be activated in dependence on a predeterminable treading moment each applied via the pedal crank drive, it is also known (U.S. Pat. No. 5,024,286 A) to provide between the hub of a chain wheel rotatably mounted on the pedal crank shaft and the pedal crank shaft a helical spring wound about the pedal crank shaft, which helical spring provides for a rotation of the pedal crank shaft with respect to the chain wheel upon application of a corresponding treading moment, so that from the angle of rotation between pedal crank shaft and chain wheel a corresponding control of the auxiliary motor can be derived. However, this known construction can only be used for the control of an auxiliary motor, but not for an improvement of the torque distribution via a pedal crank rotation.

SUMMARY OF THE INVENTION

It is therefore the object underlying the invention to design a pedal crank drive comprising a power transmission spring in the drive connection between the pedal cranks and the wheel to be driven, in order to improve the torque distribution via a pedal crank rotation with simple means, so that not only a conversion of conventional pedal crank drives becomes possible, but also a compact, weight-saving construction can be ensured.

Proceeding from a pedal crank drive as described above, the invention solves this object in that the power transmission spring consists of separate spring elements circumferentially distributed around the periphery of the shaft and each supported on the hub of the chain wheel and on the shaft.

Due to the arrangement of the power transmission spring in the bearing housing of the shaft, otherwise necessary constructive modifications of the pedal crank drive become superfluous, so that merely a rotatable mounting of the chain wheel with respect to the shaft must be ensured, but the restricted space conditions inside the bearing housing not only lead to unfavorable applications of force, but also to small ranges of spring, which due to the related high loads acting on the power transmission spring excludes the use of a helical spring. Only by dividing the power transmission spring into a plurality of separate spring elements distributed over the periphery can there be achieved a construction which satisfies all requirements, because due to this measure the occurring loads can be distributed over the individual spring elements, which can each be formed correspondingly. Moreover, as compared to helical springs a more favorable dependence of the spring force on the range of spring can be adjusted for this application, so that a damping spring prestressed in the loading sense of the power transmission spring can be omitted.

The spring elements may be designed differently. One possibility lies in that the spring elements of the power transmission spring consist of axial spring rods, which with little space requirement can be arranged in the annular space between the shaft and the bearing housing enclosing the same in a number adapted to the required spring force. To obtain particularly simple constructional conditions, the spring rods may be connected with terminal bearing rings to form a constructional unit. A small constructional effort is ensured in this connection when the spring rods with the bearing rings are formed of a sleeve with longitudinal slots.

Torsional moments represent an additional load acting on the spring rods, which must be considered when dimensioning the same. To avoid such additional loads, the spring rods may advantageously be designed as unilaterally clamped bending rods, whose end opposite the clamping end is pivotally mounted, so that torsional moments can largely be excluded.

Another possibility for the design of the power transmission spring is obtained when the shaft has radial projections protruding against the hub of the chain wheel and distributed over the periphery, which projections engage in gaps between like projections of the hub, where between the tooth-like intermeshing projections of the shaft and the hub the spring elements are provided. This arrangement also provides for the use of individually loaded spring elements, which may be formed by cup springs, leaf spring clips, elastomeric spring members or the like.

To limit the load acting on the individual spring elements, the angle of rotation between the pedal crank and the hub of the chain wheel may in addition be limited by stops. The load acting on the spring elements depends on this angle of rotation, so that by means of corresponding stops to limit the maximum admissible angle of rotation an overloading of the spring elements can be excluded.

To obtain an advantageous constructional unit, the hub of the chain wheel may be rotatably mounted in the bearing housing for the shaft, so that for conversion purposes it is merely necessary to replace a conventional bearing housing by a bearing housing which has the power transmission spring between the shaft and the hub of the chain wheel mounted in the bearing housing.

As has already been explained above, a damping spring can be omitted due to the special design of the power transmission spring consisting of spring elements distributed over the periphery of the shaft or the hub. When there is nevertheless used a damping spring, there is obtained the advantageous possibility to adapt the force conditions to the user of the bicycle. The damping spring can be inserted subsequently between the pedal crank adjacent the chain wheel and the chain wheel, which due to the restricted spring force of the damping spring involves no difficulties. When the subsequent insertion of the damping spring should be avoided, the damping spring can advantageously be accommodated in the bearing housing of the shaft, where a simple solution is offered in particular for the case that the spring elements are arranged between the intermeshing tooth-like projections of the shaft and the hub of the chain wheel, because then the damping spring can also be divided into individual spring elements between the tooth-like projections.

BRIEF DESCRIPTION OF THE DRAWINGS

In the drawing, the subject-matter of the invention is represented by way of example, wherein:

FIG. 2 shows this pedal crank drive in a section along line II—II of FIG. 1,

FIG. 3 shows a section along line III—III of FIG. 2,

FIG. 5 shows segments of the arrangement of the power transmission spring of a further embodiments in a side view of the hub of the chain wheel rotatably mounted on the shaft, and FIG. 6 shows a section along line VI—VI of FIG. 5.

DETAILED DESCRIPTION OF PREFERRED EMBODIMENTS

Figure 1:
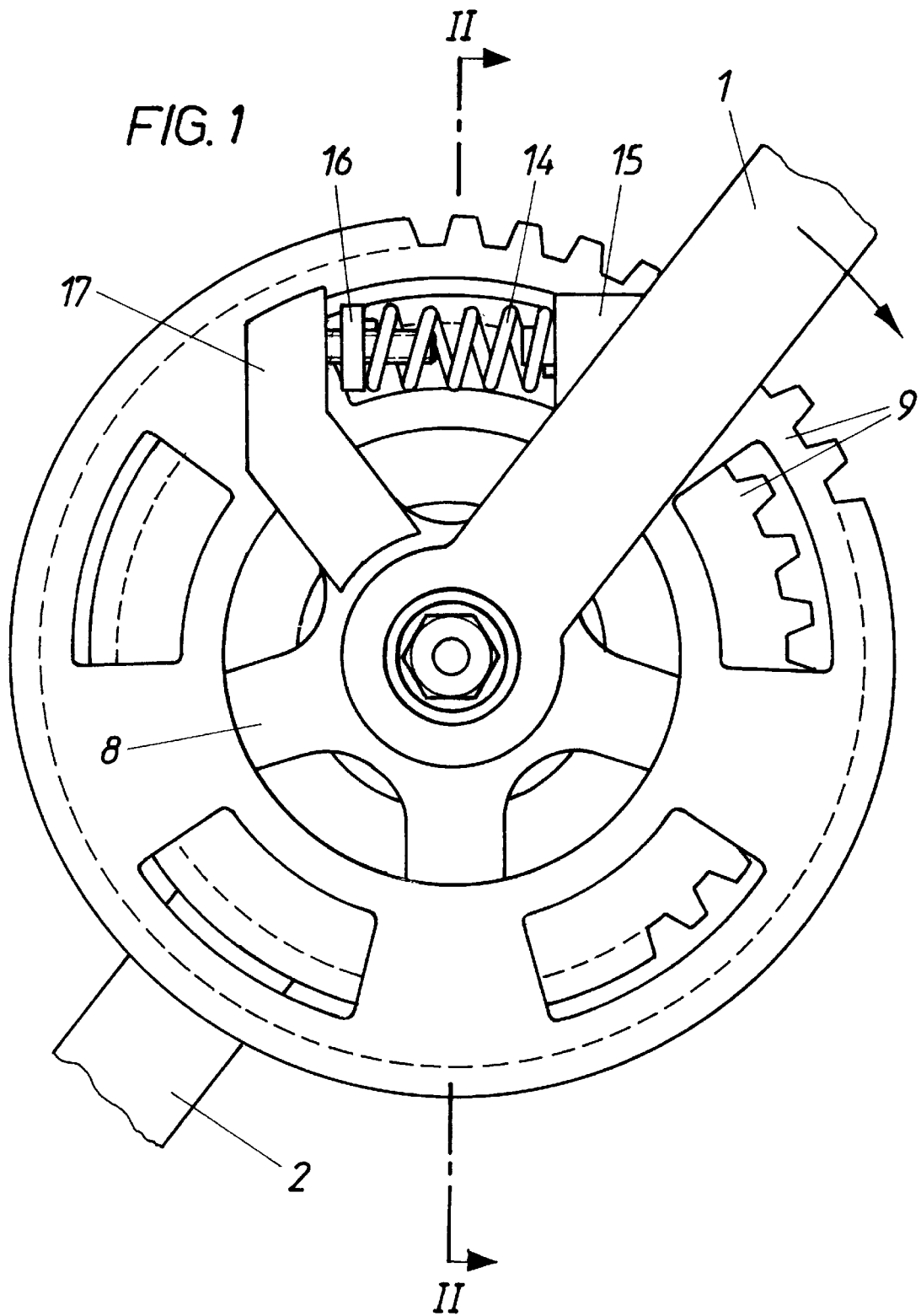
FIG. 1 shows an inventive pedal crank drive in a simplified side view.

The pedal crank drive in accordance with the embodiment shown in FIGS. 1 to 3 substantially consists of two pedal cranks 1 and 2, which are fixedly connected with each other by shaft 3. This shaft 3 is mounted in a bearing housing 4, which can be inserted in a bicycle frame in the usual way. The bearing housing 4 not only accommodates an antifriction bearing 5 for the shaft 3 in the vicinity of the one end face, but also an antifriction bearing 6 for the hub 7 of a chain wheel 8 at the opposite end face, as can be seen in FIG. 2. On this chain wheel 8 a plurality of gear rims 9 are replaceably flange-mounted. Since the shaft 3 extends with a clearance through the hub 7 of the chain wheel 8 protruding into the bearing housing 4, the chain wheel 8 can be rotated with respect to the shaft 3 or the pedal cranks 1 and 2. This rotation can, however, only be effected by a power transmission spring 10 provided in the bearing housing 4, which is composed of a plurality of spring elements 11 distributed over the periphery of the shaft 3. As shown in FIGS. 2 and 3, the spring elements 11 consist of spring rods concentrically surrounding the shaft 3, which spring rods are inserted on the one hand in receiving holes of a terminal flange 12 of the chain wheel hub 7 and on the other hand in an annular projection 13 of the shaft 3. The power transmission from the pedal cranks 1 and 2 to the chain wheel 8 is thus effected by means of the power transmission spring 10, whose spring rods are prestressed under a bending and torsional load when treading down the pedal cranks 1 and 2, in order to deliver the spring energy stored when treading downwards to the chain wheel 8 in the vicinity of the dead center of the pedal cranks 1 and 2 with the effect that there can be achieved a more uniform torque distribution by a chain wheel rotation.

Since the supporting moment, which must be applied by the cyclist in the vicinity of the dead center of the pedal crank drive in order to prevent the shaft 3 from rotating back during the relaxation of the power transmission spring 10, must remain restricted, an additional damping spring 14 is provided between the pedal crank 1 and the chain wheel 8, which damping spring is supported in accordance with FIG. 1 on the one hand on a stop 15 of the pedal crank 1 and on the other hand on an adjustable stop 16, which is adjustably held in a bearing block 17 screwed to the chain wheel 8. The relaxation of the power transmission spring 10 is thus damped by the damping spring 14 prestressed in the sense of the prestressing of the power transmission spring 10, so that as a result of this damping a strong enough power transmission spring 10 can be used for receiving the drive forces, without having to fear that the uniform rotary drive will be impaired.

Figure 4:
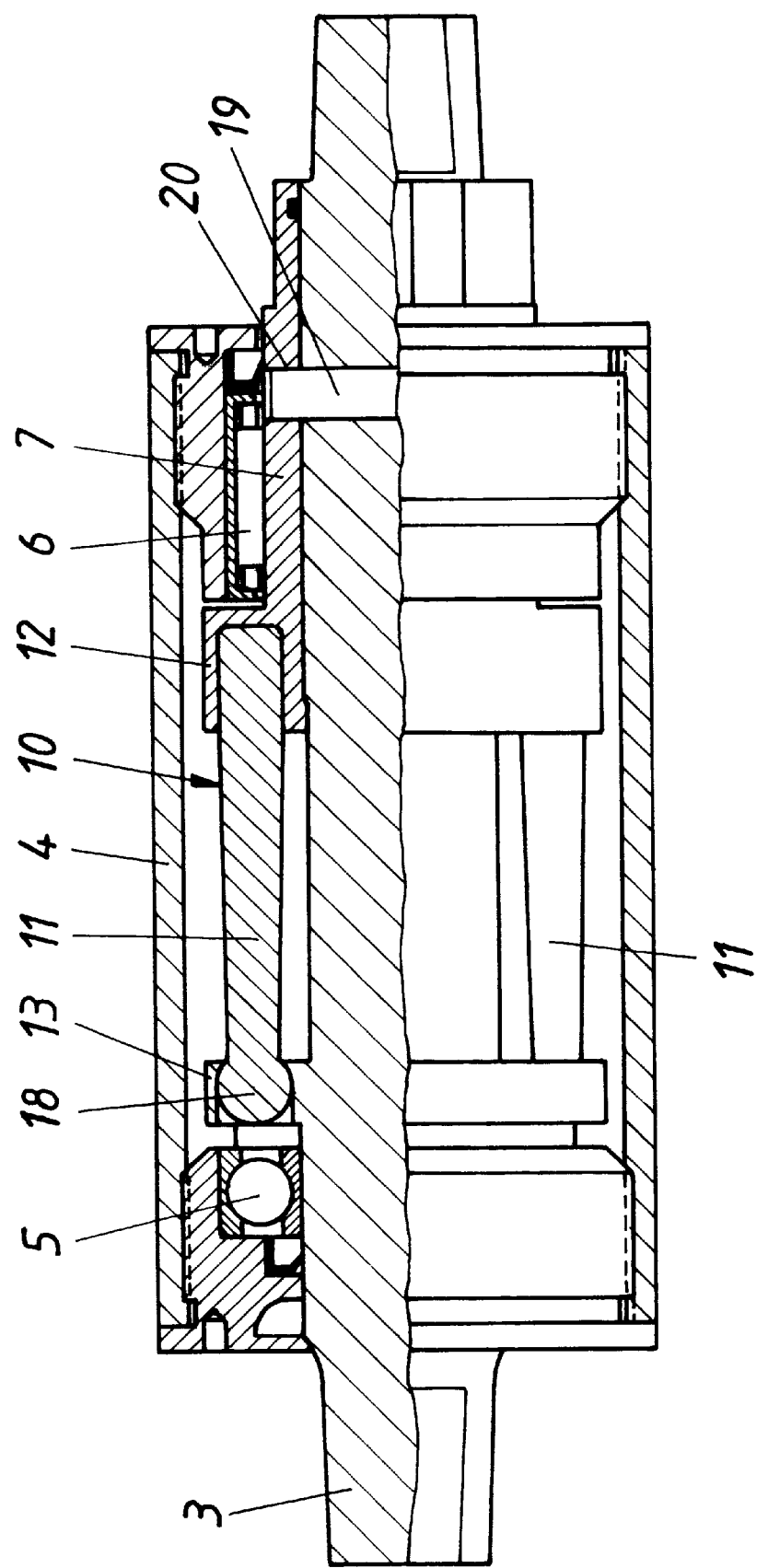
FIG. 4 shows a another embodiment of an inventive pedal crank drive in an axial section through the bearing housing for the pedal crank shaft on an enlarged scale.

To avoid a torsional load of the spring rods be avoided, the spring rods may be designed, as shown in FIG. 4, as bending rods having one end rigidly clamped in the terminal flange 12 of the hub 7, while their opposite end are held in the annular projection 13 of the shaft 3 so as to be freely movable by means of a spherical head 18, so that merely bending moments can be transmitted by the spring rods. To obtain an additional overload protection for the spring elements 11 of the power transmission spring 10, the angle of rotation between the shaft 3 and the hub 7 is limited by stops. As shown in FIG. 4, these stops are formed by a radial stop pin 19 of the shaft 3 and an oblong hole 20 extending in peripheral direction in the hub 7, in which engages the stop pin 19. The hub 7 can therefore only be rotated with respect to the shaft 3 until the stop pin 19 strikes against one of the two ends of the oblong hole 20.

The power transmission spring 10 need, however, not be composed of bending rods, but can also be composed of other spring elements 11. FIGS. 5 and 6 represent an embodiment according to which the spring elements 11 consist of elastomer blocks which are inserted in gaps between radial projections 21 and 22 of the shaft 3 on the one hand and of the hub 7 on the other hand,. In this case, too, the load acting on the power transmission spring 10 is distributed over individual spring elements 11 separated from each other. This construction is also suited for composing the damping spring 14 of individual spring elements 23, which are in turn disposed between the radial projections 21 and 22 of the shaft 3 or the hub 7, as can be seen in particular in FIG. 6. It need probably not be explained in detail that the elastomer blocks can also be replaced by spring elements 11 in the form of cup springs or leaf spring clips.

The invention is of course not restricted to the illustrated embodiments. For instance, the power transmission spring 10 need not be provided in the vicinity of the pedal crank shaft. It might also be provided in the vicinity of the bearing housing for the shaft of the rear wheel between the rear wheel shaft and the chain wheel for driving the rear wheel shaft. The basic construction of the spring arrangement can also be maintained in this case. In addition, the spring rods of the power transmission spring with terminal bearing rings might preferably be integrally connected, where the bearing rings should on the one hand be supported on the hub of the chain wheel and on the other hand on the shaft.

What is claimed is:

1. A pedal crank drive for a bicycle, comprising
   (a) a shaft,
   (b) a bearing housing, the shaft extending through the bearing housing,
   (c) a chain wheel having at least one gear rim and a hub, the hub being rotatably mounted on the shaft, and
   (d) a power transmission spring means disposed inside the bearing housing, the power transmission spring means consisting of separate individual spring elements circumferentially distributed around the periphery of the shaft, each spring element being supported on the hub of the chain wheel and on the shaft.

2. The pedal crank drive of claim 1, wherein each spring element consists of an axial spring rod.

3. The pedal crank drive of claim 1, further comprising terminal bearing rings supporting the ends of the axial spring rods.

4. The pedal crank drive of claim 2, wherein the axial spring rods are bending rods having one rigidly clamped end while an opposite end thereof is pivotally supported.

5. The pedal crank drive of claim 1, wherein the shaft has radial projections protruding against the hub and the hub has intermeshing radial projections protruding against the shaft into gaps between the radial shaft projections, the spring elements being arranged in gaps between the intermeshing radial projections.

6. The pedal crank drive of claim 1, comprising stops limiting the angle of rotation between the shaft and the hub of the chain wheel.

7. The pedal crank drive of claim 1, wherein the hub projects into the bearing housing and is rotatably mounted in the bearing housing.

8. The pedal crank drive of claim 1, further comprising a damping spring arranged between the shaft and the hub, the damping spring being prestressed in the sense of the loading force of the power transmission spring means.

9. The pedal crank drive of claim 8, wherein the damping spring is arranged in the bearing housing.

* * * * *